United States Patent [19]

Ridenour

[11] 4,231,596
[45] Nov. 4, 1980

[54] TUBING JOINT ASSEMBLY

[76] Inventor: Ralph G. Ridenour, 626 Lexington-Ontario Rd., Mansfield, Ohio 44903

[21] Appl. No.: 887,491

[22] Filed: Mar. 17, 1978

[51] Int. Cl.² .............................................. F16L 13/14
[52] U.S. Cl. ................................... 285/382.2; 29/516;
 285/397; 285/398; 285/422
[58] Field of Search .................. 285/382, 382.1, 382.2,
 285/256, 398; 29/516

[56] References Cited

U.S. PATENT DOCUMENTS

| | | | |
|---|---|---|---|
| 2,314,236 | 3/1943 | Mott | 285/256 |
| 3,378,282 | 4/1968 | Demler, Sr. | 285/174 |
| 3,417,456 | 12/1968 | Carlson | 285/382 X |
| 3,425,719 | 2/1969 | Burton | 285/382.2 |
| 3,674,292 | 7/1972 | Demler, Sr. | 285/382 X |
| 3,744,122 | 7/1973 | Ridenour et al. | 285/382.2 X |
| 3,777,354 | 12/1973 | Masters | 285/398 X |
| 3,827,727 | 8/1974 | Moebius | 285/382.2 X |
| 4,061,367 | 12/1977 | Moebius | 285/382.2 |
| 4,114,656 | 9/1978 | Kish | 285/256 X |
| 4,114,930 | 9/1978 | Perkins et al. | 285/382 X |

Primary Examiner—Thomas F. Callaghan
Attorney, Agent, or Firm—Pearne, Gordon, Sessions

[57] ABSTRACT

An inner sleeve is used in a tubing joint assembly with this inner sleeve having a lateral shoulder generally perpendicular to the axis of the sleeve and with this shoulder terminating in a sharp angled peripheral rib. A tube is telescoped over this inner sleeve. An outer sleeve may optionally be telescoped over the tube and the entire assembly inwardly compressed by two dies which have interdigitated teeth. This compresses the outer sleeve, where used, and compresses the tube onto the peripheral ribs of the inner sleeve. The interdigitated teeth on the dies assure complete compression all the way around the periphery of the tube onto the inner sleeve with a lateral shoulder being formed on the tube to act against the lateral shoulder on the inner sleeve and thus longitudinally retain together these parts. Also a fluid pressure tight seal is established primarily at the sharp angled peripheral rib and its junction with the inner wall of the tube.

21 Claims, 7 Drawing Figures

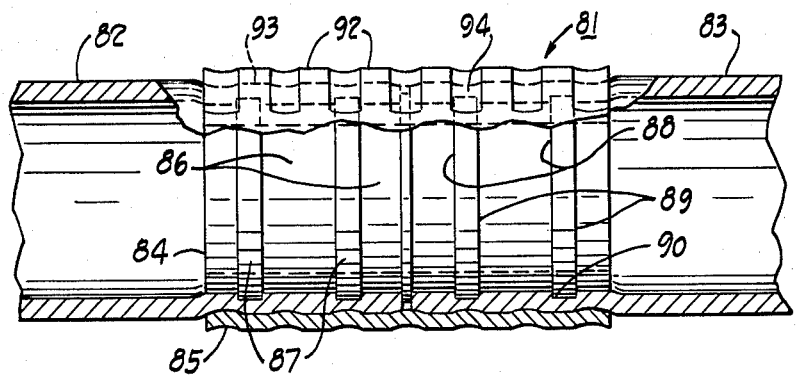
Fig. 4
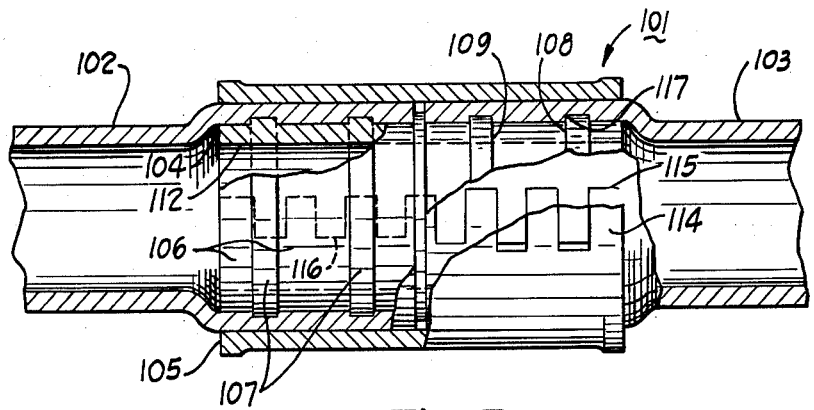
Fig. 5
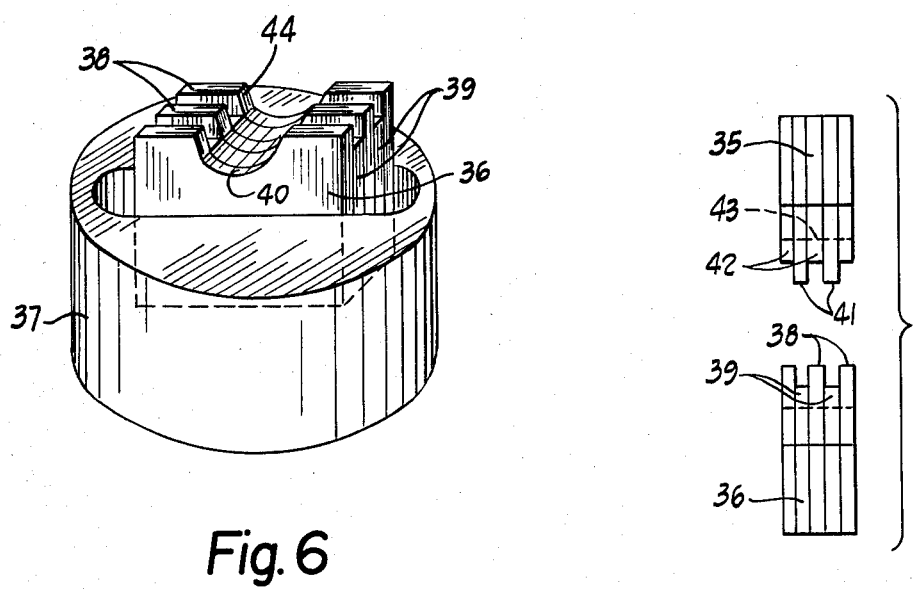
Fig. 6
Fig. 7

TUBING JOINT ASSEMBLY

BACKGROUND OF THE INVENTION

A tube fitting assembly has been disclosed in U.S. Pat. No. 3,744,122 wherein a pair of dies inwardly compress a tube onto a tubular part of a fitting. The dies had long and short fingers two alternately overlap to create shear walls and merging walls to promote a good compression inwardly of the tube onto the tubular extension of the fitting. Such tube fitting was contemplated as having both a tube and the tubular extension of the fitting of the same type of metal, for example, aluminum, which could be readily deformed. Such tube fitting did not contemplate the use of preformed sharp angled shoulders or biting surfaces on the inner tubular part, and hence was limited in the amount of fluid pressure that it could withstand and the amount of rapid temperature change that it could withstand without leaking.

Another prior art tube fitting was one which used a soft metal sleeve on the outside of a plastic body and the soft metal sleeve was compressed inwardly by a compound movement of three dies so that the plastic body was compressed onto an inner tube. The difficulty with such construction was attempting to insure the uniform compression in all radial directions so that no leakage would occur in the tube fitting. During the compression first the outer sleeve was made oval in shape and then attempted to be changed to a round cross-section. A major difficulty with this construction was the fact that different tubes have a manufacturing tolerance in dimensions, and if the tube was slightly undersize then the dies had difficulty to compress the sleeves sufficiently for a fluid tight seal.

Another prior art construction was used for sealing a tubular tank onto a nosecone of a rocket. The nosecone had annular ribs to which the tubular tank wall was secured by an inward force which was substantially radially inward in all positions around the periphery. In order to obtain this radially inward force, an explosive impulse was required or a high energy rate magnetic impulse was required. Another alternative was welding. All three such methods could be quite satisfactory for military applications, but for tube fittings manufactured by the millions, the extremely high cost of such seal forming methods made them out of the question from a commercial standpoint.

SUMMARY OF THE INVENTION

The problem to be solved is how to achieve a fluid pressure tight seal in a very economical manner in a tube fitting assembly which is subject to fluid shocks, rapid temperature changes and high fluid pressure. This problem is solved by a tubing joint, comprising, in combination, an inner tubular part having an outer wall, a tube surrounding and extending over said tubular part, retention means longitudinally retaining together said tubular part and said tube and including a lateral shoulder on said tubular part larger in cross-sectional area than and acting against a lateral abutment on said tube, seal means establishing a fluid tight seal between said tubular part and said tube and including a laterally directed sharp-angled peripheral rib on said tubular part engaging an annular area on the inner wall of said tube, and said retention means including an inwardly compressed portion of said tube with a longitudinal row of a plurality of oppositely directed circumferentially extending teeth on the exterior surface of said tube.

An object of the invention is to provide a tubing joint assembly wherein a sharp annular rib is formed on an inner tubular part to bite into the surface of an outer tubular part compressed thereon.

Another object of the invention is to provide a tubing joint assembly wherein a pair of compression dies having overlapping fingers provides an inward compression of an outer sleeve so that it is inwardly compressed all around the periphery.

Another object of the invention is to provide a tubing joint assembly with a zig-zag seal path which intersects a sharp annular rib on an inner tubular part so that an annular fluid seal is achieved.

The problem may also be solved by utilizing the method of making a tube joint assembly between inner and outer tubular parts by use of two dies comprising, the steps of, forming a plurality of peripheral ribs on the outer surface of the inner tubular part with each rib having a laterally extending shoulder and a longitudinally extending biting surface, telescoping the outer tubular part over the inner tubular part, and laterally compressing the outer part inwardly by two dies having interdigitated teeth to form on the exterior surface of the joint assembly a toothed area of a plurality of circumferentially extending teeth, said lateral compression causing said biting surfaces to indent the outer part and form a shoulder on the outer part acting longitudinally against said laterally extending shoulder on the inner part to longitudinally retain together the tubular parts, and said lateral compression establishing a fluid pressure tight seal which includes an annular area at the junction of the parts generally at said biting surfaces.

Another object of the invention is to provide a method of fabricating a tube joint assembly which includes forming a plurality of sharp annular ribs on an inner sleeve onto which the outer tubular part is inwardly compressed for a seal.

Other objects and a fuller understanding of the invention may be had by referring to the following description and claims, taken in conjunction with the accompanying drawing.

BRIEF DESCRIPTION OF THE DRAWING

FIG. 4 is a side elevational view, partly in longitudinal section, of a further modification;

FIG. 5 is a side elevational view, partly in longitudinal section, of a still further embodiment;

FIG. 6 is an isometric view of a die which may be used to compress the tubing joint; and FIG. 7 is a side elevational view of two dies which may co-act to form the tubing joint.

DESCRIPTION OF THE PREFERRED EMBODIMENTS

The invention is illustrated in the accompanying drawing as being an improved tubing joint assembly and the method for making this tubing joint. An inner and an outer tubular part are joined together by an inward compression force on the outer tubular part. In addition there may be an optional outer sleeve onto which the compression force is applied and through this outer sleeve to the outer of the two tubular parts. The two tubular parts are telescoped together to establish a facing wall on each of these two parts. On one of the facing walls a lateral shoulder is established which is peripheral in direction. This lateral shoulder terminates in a peripheral biting surface which has at least a minimal longitudinal extent. When compression dies are used to compress the outer tubular part onto the inner tubular part, the biting surface bites into the surface of the other facing wall to establish a second lateral shoulder. The coaction between the lateral shoulder on the inner tubular part and the lateral shoulder on the outer tubular part establishes a longitudinal retention means so that the two tubular parts resist being pulled apart. This enables the tubing joint to withstand high pressures.

Additionally a fluid pressure tight seal is established primarily at the sharp angled shoulder of the peripheral rib so that an annular seal is established between the two tubular parts. The use of two dies with interlocking or interdigitated teeth establishes an inward compression force in all circumferential positions around the periphery of the tubing joint and especially includes a radially inward force along lines generally perpendicular to the direction of movement of the two dies in compression upon the outer tubular part. This is extremely important in achieving a fluid pressure tight seal in a complete annular path.

Figure 1:
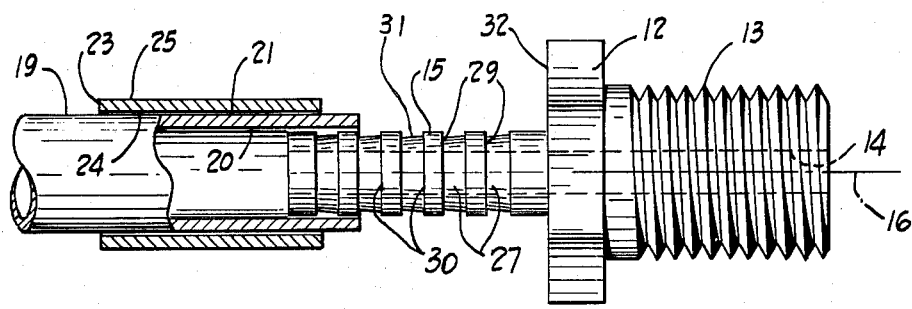
FIG. 1 is a side elevational view, partly in longitudinal section, showing a partly assembled tubing joint according to the invention.
Figure 2:
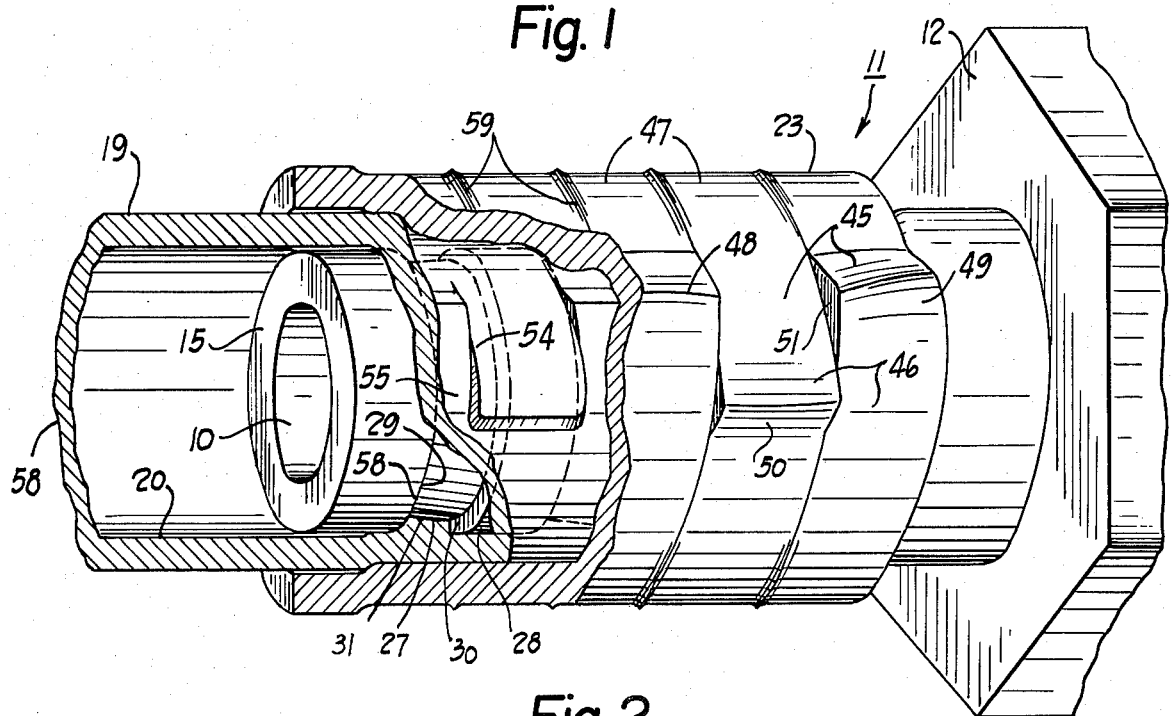
FIG. 2 is an isometric view, partly in section, of the assembled fitting of FIG. 1.

FIG. 1 illustrates a tubing joint just prior to assembly and FIG. 2 is an isometric view illustrating the same tubing joint assembly 11 as completed. FIG. 1 illustrates a tube fitting 12 having a body portion with male threads 13 for securing the fitting 12 to some utilization device, not shown. The fitting 12 has an internal bore 14 for passage of fluid. The fitting 12 has a first tubular part 15 extending along the axis 16 of the internal bore 14. This merely illustrates one form of fitting wherein the internal bore 14 communicates with the inner wall of the first tubular part 15, and this may be many types of fittings such as elbow, T or cap fittings. A tube 19 having an inner wall 20 and outer wall 21 is shown with the inner wall 20 partly telescoped over the outer wall 22 of the tubular part 15. A sleeve 23 is optional and has an inner wall 24 and outer wall 25. The sleeve 23 is shown with the inner wall 24 telescoped over the end of the tube 19.

The first tubular part 15 has been machined or otherwise formed to establish grooves 27 and these grooves 27 form a plurality of peripheral ribs 28 having lateral shoulder 29 facing longitudinally rearwardly and lateral shoulders 30 facing longitudinally forwardly, relative to the outboard end of the tubular part 15. The bottom wall 31 of the grooves 27 may be parallel to the axis 16, as shown in FIG. 1, or may be slightly inclined to this axis, as shown in FIG. 2.

To complete the tubing joint assembly 11 as shown in FIG. 2, the parts shown in FIG. 1 are telescoped so that the tube 19 preferably completely covers the tubular part 15 and the sleeve 23 covers all or most of the end of the tube 19. In FIG. 2, the sleeve 23 is spaced from the face 32 of the fitting 12. Generally, both the sleeve 23 and tube 19 will have the ends thereof abutting the face 32 of the fitting 12, as a stop. Initially all of the parts will generally have a slip fit with a few thousandths of an inch clearance, although an interference fit is possible to be used. The normal manufacturing tolerance on metal tubes may be 0.003 to 0.005 inches in internal diameter, so the usual clearance between the parts is slightly more than this, in the range of one-eighth to one-half inch inside diameter of the tube 19 and sleeve 23. In the preferred embodiment, all of the parts are of metal, for example, they may include an aluminum fitting 12 and aluminum tube 19 with the sleeve 23 of aluminum or stainless steel, or perhaps plated ordinary steel.

After the sleeve 23 and tube 19 have been pushed up against the stop face 32, then a pair of dies 35 and 36 as shown in FIG. 7 are used to compress the assembled parts. The die 36 is shown in perspective view in FIG. 6 and includes a die holder 37 in which are mounted a plurality of long fingered plates 38 alternating with a plurality of short fingered plates 39. A partially cylindrical aperture 40 is formed in all of plates 38 and 39 of a dimension to compress the sleeve 23. As shown in FIG. 7 the other die 35 is quite similar to the die 36 but with complementary long and short fingered plates 41 and 42, respectively. As best seen in FIG. 7 the long fingers 41 will interlock with or interdigitate with the long fingers 38 of the die 36 when the two dies 35 and 36 are moved together. There is a partially cylindrical aperture 43 in the die 35 which is complementary to the partially cylindrical aperture 40 in die 36. Together these form a generally cylindrical aperture to receive the sleeve 23 and compress this sleeve so that when the dies 35 and 36 are compressed on the assembled parts, a compression staked surface 45 is established on the outer portion of the sleever 23. This may be generally the same as in U.S. Pat. No. 3,744,122 issued July 10, 1973. This compression staked surface includes a toothed area 46 and an inwardly compressed area 47. The cylindrical aperture 40, 43 formed by the closed dies 35, 36, is smaller than the initial diameter of the sleeve 23, so that the inwardly compressed area 47 is formed and the metal is worked or partially extruded to form individual teeth 48 in the toothed area 46. These individual teeth are interdigitated with the diverging walls 44 of the dies forming a merging wall 49. Junction walls 50 are formed generally at the junction of the merging wall 49 with the short fingers of the other die. Shear walls 51 are formed between the interdigitated teeth 48, because the extruded metal is partially sheared and lies generally perpendicular to the merging walls 49. The effect of these interdigitated teeth 48 is to establish a large inwardly directed force generally perpendicular to the direction of movement of the dies 35 and 36 in closing on the assembled parts. This is in contradistinction to the generally outward bulging of sleeves compressed by prior art dies which do not have the interdigitated fingers on the dies.

This toothed area 46 therefore has a large component of inwardly directed compression force which is transmitted through the material of the sleeve 23 to compress it inwardly into engagement with the tube 19 and in turn to compress it inwardly to engage all of the exterior surface of the inner tubular part 15.

It is difficult to take apart one of the tube joint assemblies after it has been assembled, yet when one has been sawed apart longitudinally and disassembled, one may observe on the outer surface of the tube 19 a zig-zag seal path 54. This zig-zag seal path lies immediately beneath the toothed area, and specifically beneath each of the junction walls 50 there are slightly compressed seal areas 55 which seal areas are intermeshing or interdigitated. The zig-zag seal path 54 forms indentations in the outer surface 21 of the tube 19 so that a fluid tight seal is established between the sleeve 23 and tube 19. This fluid tight seal path is not needed in this particular embodiment using the extra sleeve 23 as a reinforcing sleeve for mechanical strength. However, this zig-zag seal path 54 does assure that the tube 19 is inwardly compressed all around the periphery thereof on to the outer surface of the inner tubular part 15.

The inner tubular part 15 has the grooves 27 and peripheral ribs 28 separated by the lateral shoulders 29 and 30. Due to the inward compression of the tube 19, the inner wall 20 thereof makes a fluid tight seal with the inner tubular part 15. This seal path is established primarily at the laterally directed sharp angled edge formed at the junction between the peripheral rib 28 and each of the shoulders 29 and 30. This is a sharp biting edge on the inner tubular part 15 which bites into the inner surface 20 of the tube 19 as it is being compressed inwardly. Thus the peripheral ribs 28 are biting surfaces to establish this good fluid tight seal.

Retention means is also provided to resist longitudinal separation of the tube 19 and inner tubular part 15. At fluid pressures up to 2,000 psi, for example, there is a large longitudinal separating force which is resisted primarily by the rearwardly facing lateral shoulders 29 engaging and acting against a compression formed lateral shoulder 58 on the tube 19. For this reason, the bottom of the groove 27 may be slightly inclined relative to the axis as shown in FIG. 2, rather than substantially parallel to the axis 16 as shown in FIG. 1. To establish a fluid tight seal and to establish the retention means, it is not imperative that the compression formed lateral shoulder 58 extend completely to the radially inward edge of the lateral shoulders 29 and 30, yet in actual practice it has been found that the dies 35 and 36 will produce such compression formed lateral shoulders so that there are no voids whatever in the space between the tube 19 and the inner tubular part 15. Small ridges 59 may be formed on the outer surface by the spaces between the plates of the dies.

Figure 3:
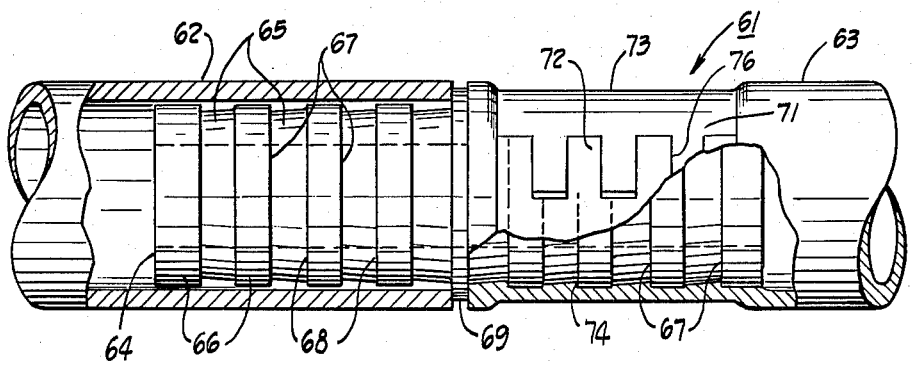
FIG. 3 is a side elevational view, partly in longitudinal section, of another embodiment of the invention.

FIG. 3 illustrates another tubing joint assembly 61 which connects one tube 62 with another tube 63 by means of an inner tubular part, in this case a sleeve 64. The left half of FIG. 3 is shown with the tube 62 telescoped over the sleeve 64, but not yet compressed, whereas the right half of FIG. 3 is shown after the tube 63 has been compressed upon the sleeve 64. It will be understood that the tube 62 is compressed upon the sleeve 64 to complete the entire tubing joint assembly 61, but the FIG. 3 is shown in this manner to show the transition between the merely telescoped condition of the tube and sleeve and the finished assembly 61.

In this assembly 61 of FIG. 3, there is no fitting involved as a large machined fitting body, merely the sleeve 64 provides physical connection between and fluid communication between the tubes 62 and 63. The sleeve 64 is provided with grooves 65 which form the peripheral ribs or lands 66. Lateral shoulders interconnect these ribs and grooves with the lateral shoulders including rearwardly facing lateral shoulders 67 and forwardly facing lateral shoulders 68. The sleeve 64 may also have a small centering stop 69 to aid in establishing each tube 62 and 63 telescoped over fully half of the length of the sleeve 64.

If long enough dies 35 and 36 are provided, the entire tubing joint assembly 61, embracing both of the tube ends 62 and 63, may be compressed at one time. Alternatively, if short dies are used as shown in FIGS. 6 and 7, then only one half of the joint assembly 61 may be compressed at a time, as shown at the right half of FIG. 3. The use of these dies of the type shown in FIGS. 6 and 7 will again produce the compression staked surface 71, this time directly on the outer surface of the tubes 62 and 63. The compression staked surface includes a toothed area 72 and an inwardly compressed area 73. The cylindrical aperture 40, 43 in the dies will be selected to be sufficiently smaller than the initial diameter of the tubes 62 and 63 so that upon closing of the dies on the assembled parts, the compression staked surface 71 on the exterior of the tubes will force the metal of the tubes to flow into the grooves 65. As in the embodiment of FIGS. 1 and 2, this will establish a fluid tight seal and will establish a retention means to longitudinally retain the tubes on the sleeve 64. The seal is again established by the compression of the inner surface of the tubes around the sharp angled peripheral ribs and specifically at the sharp corner of the junction of the shoulders 67 and 68 with the peripheral ribs 66. The longitudinal retention means, which resists longitudinal separation due to fluid pressure or mechanical force, is established primarily by the rearwardly facing lateral shoulders 67 on the sleeve being engaged by compression formed lateral shoulders 74 on the tubes 63 and 62. It will be noted that these rearwardly facing lateral shoulders 67, for the tube 63, are on the opposite sides of the ribs from the rearwardly facing shoulders for the tube 62.

The toothed area 72 on the exterior of the tubes 62 and 63 again establishes a zig-zag seal path 76 generally underneath the edges of the teeth of the toothed area. The prominence of this zig-zag seal path depends upon the relative hardness of the tube 63 and sleeve 64. If the sleeve 64 is of the same material as that of the tube, then the sharp peripheral edges of the ridges 66 may become somewhat rounded by action of the compression of the tube onto these edges. In such case the zig-zag seal path 76 is fairly pronounced. If the sleeve 64 is of a metal harder than that of the tube, for example if it is of steel whereas copper or aluminum tube is used, then this zig-zag seal path 76 is hardly noticeable, after the assembly is cut apart, but the fluid pressure tight seal is still present. In this construction of FIG. 3, without an external sleeve, the seal is still established at the biting surfaces of the outer portion of the peripheral ribs 66, and primarily at the junction of the peripheral ribs with the lateral shoulders 67 and 68.

FIG. 4 illustrates another embodiment of the invention, in this case a tubing joint assembly 81 which joins a tube 82 with a tube 83 by means of an inner sleeve 84 and an outer sleeve 85. The sleeve 84 is similar to the sleeve 64 of FIG. 3 again having a plurality of grooves 86 which form peripheral ribs 87 between such grooves. The grooves are separated from the ribs by rearwardly facing lateral shoulders 88 and forwardly facing lateral shoulders 89. The outer sleeve 85 is again inwardly compressed by dies similar to dies 35 and 36 shown in FIG. 7. The diameter of the cylindrical aperture 40, 43 is made slightly smaller than the original diameter of the sleeve 85 so as to provide a desired amount of compression of the sleeve 85. In FIG. 3 the plane of movement of the dies 35 and 36 is parallel to the plane of the paper whereas the sectional view for FIG. 4 has been taken at right angles to that of the sectional view of FIG. 3 so that the plane of movement of the dies is perpendicular to the plane of the paper. This means that the interdigitated fingers on the dies 35 and 36 will provide a toothed area 92 on the periphery of the sleeve 85, as shown at the top of FIG. 4. This toothed area is similar to that on the tubing joint assembly 11 of FIG. 2 and compresses the sleeve 85 onto the tubes 82 and 83 and compresses these tubes inwardly onto the inner sleeve 84. This again establishes a zig-zag seal path 93 at the junction of the sleeve 85 and the tubes 82 and 83. This zig-zag seal path lies generally radially inwardly of the boundaries of the teeth of the toothed area 92. Also this inward compression establishes not only the zig-zag seal path 93 but another zig-zag seal path 94 between the inside of the tubes 82 and 83 and the inner sleeve 84.

Again the extent of the inward deformation of the tubes 82 and 83 and of the inner sleeve 84, depends upon the relative hardness of the sleeves 84 and 85 and tubes 82 and 83. If the inner sleeve 84 is considerably harder than the metal of the tubes 82 and 83, then there is not much deformation into the outer surface of this sleeve. The softer the metal of this inner sleeve, the more deformation takes place. Also the outer sleeve 85 may be of a relatively soft metal, as soft as that of the tubes, for example. If the tubes are of aluminum and the outer sleeve 85 is of aluminum, then there may be a considerable amount of deformation, and the toothed area 92 is quite pronounced. On the other hand, if this outer sleeve is of steel, with aluminum or copper tubing, then the toothed area is not nearly as pronounced, yet the inward compression still will take place. The advantage of the harder metal for the outer sleeve is greater mechanical strength and tends to hold the softer metal of the tube inwardly compressed despite greater fluid pressures.

The zig-zag seal path 94 establishes a seal primarily at the junction between the lateral shoulders 88 and 89 with the ribs or biting surface 87. The retention means is again established primarily at the longitudinally rearwardly facing lateral shoulders 88 and their engagement with compression formed lateral shoulders 90 on the tubes 82 and 83.

The zig-zag seal path 54 in the embodiment of FIGS. 1 and 2 did not achieve any fluid seal, because it was between the outer sleeve 23 and the tube 19. However, in FIG. 4 the zig-zag seal path 93 which is between the outer sleeve 85 and the tubes 82 and 83, will perform the function of a fluid pressure tight seal. This is because if for some reason the inner zig-zag seal path 94 should fail, any fluid leakage between the inner sleeve 84 and the tubes 82 and 83 would have to pass this second barrier of the zig-zag seal path 93 between the outer sleeve 85 and the tubes 82 and 83. Thus the outer sleeve 85 performs not only the function of providing greater mechanical strength but also a secondary function of providing a fluid pressure tight seal.

FIG. 5 illustrates a still further embodiment of the invention in a tubing joint assembly 101. This assembly includes the joining of tubes 102 and 103 by means of an inner sleeve 104 and an outer sleeve 105. The inner sleeve again has on the outer surface thereof grooves 106 and ribs 107 with rearwardly facing lateral shoulders 108 and forwardly facing lateral shoulders 109. The end portions 110 and 111 of the tubes 102 and 103 have been expanded by suitable means, such as swaging, so that they will receive an enlarged inner sleeve 104, the inner diameter 112 thereof being of approximately the same diameter as the inside diameter of the tubes 102 and 103. In the assembled tubing joint assembly 101, therefore, the fluid flow will not be restricted.

The outer sleeve 105 is correspondingly slightly larger in diameter initially and is compressed by dies such as dies 35 and 36 with a suitably dimensioned cylindrical aperture 40, 43. FIG. 5 illustrates this tubing joint assembly 101 as inwardly compressed by such dies to form the toothed area 114 on the exterior surface of the outer sleeve 105. The inward compression from this toothed area 114 establishes directly beneath a zig-zag seal path 115 between the sleeve 105 and the tubes 102 and 103. Also a still further zig-zag seal path 116 is concurrently formed between the tubes 102 and 103 and the inner sleeve 104. This path 116 is shown with a broken line in FIG. 5 to distinguish it from the seal path 115. Again the extent of inward deformation at this zig-zag seal path 116 will be small or almost unnoticeable if the inner sleeve 104 is of hard material. It will be of greater extent and more noticeable, upon cutting apart the assembly 101, if the inner sleeve 104 is of material no harder than that of the tubes 102 and 103.

The inward compression which forms the toothed area 114 establishes a compression formed lateral shoulder 117 on the tubes 102 and 103 engaging and acting against the rearwardly facing lateral shoulders 108 on the inner sleeve. This forms the retention means to withstand longitudinal pull and fluid pressure within the assembly 101.

The various embodiments of FIGS. 1, 3, 4 and 5 show that the peripheral ribs are established on either the inner or outer wall of one of the tubular parts. In these FIGS. 1, 3, 4 and 5 such peripheral ribs are established on an outwardly facing wall, which wall is telescoped relative to an inwardly facing wall and then such telescoped tubular parts are compressed together. Upon being compressed, the biting surface of the peripheral rib acts against and is radially restrained by the other of the facing walls.

It will be noted in the various embodiments that after the various assembled parts are inwardly compressed, the radial thickness of the combined compressed radial parts is less than the nominal radial dimension of the tube and sleeve or sleeves used in the complete assembly. This inward compression makes the metal flow so that a fluid pressure tight seal is achieved as well as forming the compression formed lateral shoulders 58, 74, 90 and 117 which act against the initially formed lateral shoulders on the inner sleeves.

In the various FIGS. 1, 3, 4 and 5 it will be noted that the zig-zag seal paths 54, 76, 93, 94, 115 and 116, have a length longer than the longitudinal length of the inner sleeve, such as sleeve 23. This establishes a long path over which fluid pressure must seek to escape, and is considered a reason why the tubing joint assemblies are so mechanically strong and will withstand such high fluid pressures, for example 2,000 psi.

In the various embodiments of FIGS. 1, 3, 4 and 5, the inner sleeve may be machined by a form tool, for example, to cut the grooves, such as grooves 65. The metal remaining between the grooves are the biting surfaces which may be considered as substantially axially parallel lands between the lateral shoulders.

The toothed areas 46, 72, 92 and 114 are longitudinally extending and they include peripheral teeth which alternate in direction and overlap each other. These individual teeth are interdigitated and it is this overlapping of narrow teeth, the width of the tooth approximating the wall thickness of the tube, that permits the great amount of inward compression of the tube against the inner sleeve for an effective seal beneath this toothed area. The prior art construction, using a pair of dies without the interdigitated fingers, often bulged the sleeve outwardly at the junction between the two dies rather than compressing it inwardly as in the present invention.

The peripheral ribs on the outer surface of the inner tubular part have some longitudinal extent, although they may be relatively sharp, such as the V-shaped crest of threads. The dies 35 and 36 may be formed in many different manners. Forming the fingered plates as separate plates and then assembling them together to make the complete die in the die holder 37 is an economical way to fabricate the entire die. If such is the case, there are often small peripheral ridges 59 on the exterior surface of the tubing joint assembly, but this does not impair the efficiency of the seal or retention means.

In the tubing joint assembly 11, for example, the first tubular part 15, the tube 19, and the sleeve 23 are all tubular parts which are telescoped together. In the assembly 11 the first tubular part 15 has a thicker wall thickness than the tube 11, so that even if made of the same material, it resists inward compression as the tube is being compressed thereonto. In the tubing joint assembly 61, 81 or 101, the inner sleeve may often be made of steel or some other metal harder than that of the tube and this is a means to resist inward crushing of such sleeve as the tube is compressed onto this sleeve.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A tubing joint, comprising, in combination,
   an inner tubular part having an outer wall,
   a tube surrounding and extending over said tubular part,
   retention means longitudinally retaining together said tubular part and said tube and including a lateral shoulder on said tubular part larger in cross-sectional area than and acting against a lateral abutment on said tube,
   seal means establishing a fluid tight seal between said tubular part and said tube and including an annular laterally directed sharp-angled peripheral rib on said tubular part engaging an annular area on the inner wall of said tube,
   said retention means including an inwardly compressed portion of said tube with a longitudinal row of a plurality of oppositely directed circumferentially extending teeth on the exterior surface of said tube, and
   said fluid tight seal means including a zig-zag seal path between said tubular part and tube lying beneath said row of teeth and crossing said peripheral rib.

2. A tubing joint as set forth in claim 1, wherein said annular rib of said seal means is contiguous with said longitudinally facing shoulder on said tubular part.

3. A tubing joint as set forth in claim 1, wherein said retention means and said seal means are both established by a laterally inwardly compressed area on said tube.

4. A tubing joint as set forth in claim 1, wherein said row of teeth extend outwardly from the surface of said tube and are unitary therewith.

5. A tubing joint assembly, comprising, in combination,
   a tubular part having an inner wall to convey a fluid and having an outer wall,
   a tube having an inner wall to convey a fluid and having an outer wall,
   a facing wall of said tube being in telescoped relation to a facing wall of said tubular part,
   a peripheral laterally extending rib on one of said facing walls,
   said rib including a laterally extending shoulder terminating in a biting surface having at least a minimal longitudinal extent,
   retention means longitudinally retaining together said tube and tubular part and including said laterally extending shoulder on said one of said facing walls acting against another laterally extending shoulder wall on the other of said facing walls,
   fluid seal means establishing a fluid tight seal in at least an annular area between said tube and said tubular part,
   said fluid seal means including said biting surface acting against and being radially restrained by said other of said facing walls,
   the radial thickness of the combined tube and tubular part at said fluid seal means being less than the nominal radial dimension of said tube plus that of said tubular part,
   the outer one of said tube and tubular part having a first zig-zag path of interlocking circumferentially extending teeth unitary with the outer surface of said outer one,
   and said fluid seal means including a zig-zag seal path between said tubular part and tube radially beneath said first zig-zag path and crossing said rib and laterally extending shoulder.

6. A tubing joint assembly as set forth in claim 5, wherein said tube and tubular part are metal.

7. A tubing joint assembly as set forth in claim 5, wherein said retention means and said fluid seal means include an inwardly compressed portion of the outer one of said tube and tubular part upon the inner one thereof.

8. A tubing joint assembly as set forth in claim 7, wherein said inwardly compressed portion establishes said circumferentially extending teeth and establishes a zig-zag compressed seal path between said tube and tubular part.

9. A tubing joint assembly as set forth in claim 8, wherein said zig-zag seal path extends longitudinally of said tubular part.

10. A tubing joint assembly, comprising, in combination,
    a first sleeve having an inner and an outer wall,
    a plurality of ribs with sharp shoulders facing laterally outwardly on said outer wall,
    a first and a second tube each having first ends extending over about half the length of said sleeve to be disposed substantially end-to-end over said sleeve,
    retention means longitudinally retaining together said sleeve and tube ends and including a laterally inwardly compressed area of each said tube end longitudinally adjacent at least one shoulder, respectively, on said sleeve,
    fluid seal means including at least one annular area on each half of said inner sleeve between said inner sleeve and the respective tube ends, interdigitated unitary teeth on the outer surface of said tube ends extending in a longitudinal row and said fluid seal means including a zig-zag seal path between said sleeve and tubes radially beneath said interdigitated teeth and superimposed on said plurality of ribs and sharp shoulders.

11. A tubing joint assembly as set forth in claim 10, wherein said retention means includes a cross-sectional area on each of said first and second tubes smaller than a cross-sectional area on said first sleeve for longitudinal engagement therebetween.

12. A tubing joint assembly as set forth in claim 10, wherein said annular area of said fluid seal means is contiguous with said shoulders of said retention means.

13. A tubing joint assembly as set forth in claim 10, wherein said at least one shoulder of said retention means is on one of said plurality of ribs.

14. A tubing joint assembly as set forth in claim 10, wherein said sleeve inner wall defines a bore having a cross-sectional area substantially equal to that of the majority of the length of each of said tubes.

15. A tubing joint assembly as set forth in claim 10, wherein said sleeve inner wall defines a bore having a cross-sectional area substantially smaller than that of the majority of the length of each of said tubes.

16. A tubing joint assembly as set forth in claim 10, including a second sleeve telescoped over said first ends of said first and second tubes and engaging said tube first ends.

17. A tubing joint assembly as set forth in claim 16, wherein said retention means includes said second sleeve laterally inwardly compressed onto said first ends of said tubes.

18. A tubing joint assembly, comprising in combination,
a first tubular part having an inner and an outer wall,
a tube telescoped over said first tubular part and having an inner and an outer wall,
a sleeve telescoped over said tube,
a plurality of sharp annular shoulders on one of said outer walls,
a herringbone inward compression path on two longitudinally opposite ends of the outer surface of said sleeve establishing a zig-zag compression path of a length longer than that of said sleeve and compressing inwardly said sleeve against said tube and compressing said tube against said first tubular part to physically lock together said tubular part, tube and sleeve, and
said zig-zag compression path establishing thereneath a fluid tight zig-zag seal path crossing said sharp annular shoulders.

19. A tubing joint assembly as set forth in claim 18, wherein said sharp annular shoulders are on said outer wall of said first tubular part.

20. A tubing joint assembly as set forth in claim 18, wherein said first tubular part is of a metal harder than the metal of said tube.

21. A tubing joint assembly as set forth in claim 18, wherein said first tubular part includes means to resist laterally inward compression to a greater extent than said tube.

* * * * *